GASTON & SMITH.
Hay Loader.
No. 12,547.
Patented March 20, 1855.
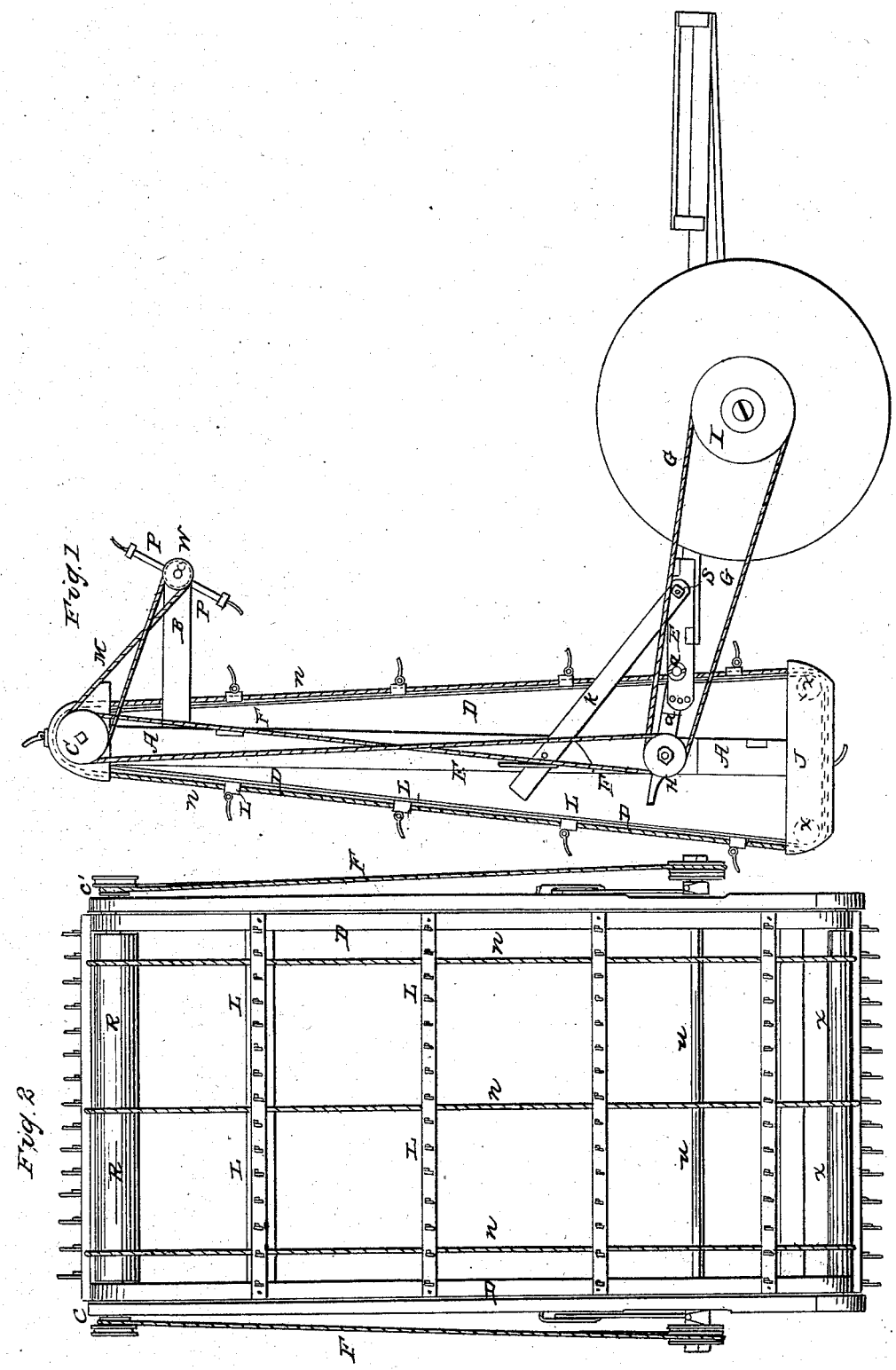

UNITED STATES PATENT OFFICE.

ALEXANDER H. GASTON AND JOSEPH SMITH, OF SUNBURY, OHIO.

IMPROVEMENT IN RAKES AND ELEVATORS.

Specification forming part of Letters Patent No. 12,547, dated March 20, 1855.

*To all whom it may concern:*

Be it known that we, ALEXANDER H. GASTON and JOSEPH SMITH, of Sunbury, in the county of Delaware, State of Ohio, have invented a new and Improved Mode of Raking and Loading Hay; and we do hereby declare that the following is a full and exact description thereof, reference being had to the accompanying drawings, and to the letters of reference marked thereon.

Our invention consists in the endless belts D D, rakes L, in combination with rollers $x$ and revolving forks P P, for the purpose of raking and loading hay.

Figure 1 is a side elevation of the machine. Fig. 2 is a rear view of the machine.

The posts A A, Fig. 1, represents a part of the frame of machine.

B represents the arms that support the revolving forks P P, by which the hay is taken from the rakes L and thrown on the wagon.

$c$ represents a band-wheel in Fig. 2, is propelled by the band F F in Fig. 1 from the pulley H, and give motion to wheel $c$ and cylinder R, that carry and give motion to the belts D D, to which the rakes L are fastened, that rake and elevate the hay.

$n\ n\ n$ in Fig. 2 are cards passing through the rake-heads for preventing the hay from falling back of the rakes. The revolving forks P P, with the shaft O, receive their motion by the wheel W from wheel $c$ by the band M.

J is a guard fast on the lower ends of posts A A, and prevents the rakes from vibrating endwise, also to keep the the rollers $x$ at proper distance in order to spread the belts D D at the bottom of machine for raking.

E is a frame, of which a part is firmly secured to the wagon, having a lap-joint in it, permitting the machine to be lowered or elevated at pleasure by pins $a$, the said frame or arms E being secured to posts A A and pulleys H by an iron rod, $u$, passing through the machine, rod $u$ having nuts on each end. The band-wheel I is placed on the hubs of the wagon-wheels on either side of the spokes, and by means of the band G G, passing over the pulley H, gives motion to the machine, as above shown.

K is a brace securing said machine at desired angles for raking or lowering the top of said machine on the wagon by drawing-pins S.

The machine may be attached or detached to or from the wagon by the pins $a$ and S.

What we claim as new, and desire to secure by Letters Patent of the United States, is—

The endless belts D D and rakes L, in combination with rollers $x'\ x$, revolving forks P P, for the purpose of raking and loading hay, as set forth.

ALEXANDER H. GASTON.
JOSEPH SMITH.

Attest:
G. W. TORRENCE,
EDWARD VAUGHN.